United States Patent Office 3,363,737
Patented Jan. 16, 1968

3,363,737

PULSE GENERATING KEY BOARD

Tasaku Wada and Kahei Furusawa, Tokyo-to, Japan, assignors to Kokusai Denshin Denwa Kabushiki Kaisha, Tokyo-to, Japan, a joint-stock company of Japan Filed Apr. 5, 1967, Ser. No. 628,633
Claims priority, application Japan, Apr. 11, 1966, 41/22,439; Dec. 21, 1966, 41/83,250
9 Claims. (Cl. 197—98)

ABSTRACT OF THE DISCLOSURE

A key board using a plurality of keys, in each of which a unidirectional pulse signal is generated through a sensing coil wound on a fixed cylindrical core when a plate of magnetic material in contact with an end of the cylindrical core is separated from the cylindrical core in accordance with keying of a keying bar. The construction is such that either the core or the plate is a permanent magnet.

This invention relates to a key board and more particularly to a key board to generate a pulse signal or signals by keying keys on the key board.

In conventional key boards of this type, usually electrical contacts are mechanically closed or opened. Accordingly, since loose contacts occur due to stain or dirt on the electrical contacts, it is difficult to maintain high reliability of the electrical contacts for a long time. To generate the output pulse signal or signals, it is also necessary to provide an electric source which supplies the switched current to the contacts.

Moreover, a conventional key-board transmitter employing the above mentioned key board is usually provided under the keys of the key board and a plurality of code bars the number of which is equal to the number of code-units and which are operated in response to the keying of the keys so as to compose respective coded signals.

Another known key board transmitter is provided with electrical contacts switched by the keying of the keys and with a code converter to compose respective coded signals in accordance with the switched outputs of the electrical contacts. In the former device, it is difficult to carry out the high-speed keying on account of the limit of the keying speed of the mechanically operating code-bars and it is necessary to carry out the maintenance of mechanical parts at regularly recurring intervals of time.

In the latter device, since the electrical contacts are worn out or strained after long operation, chatterings or loose contacts of the electrical contacts are liable to occur.

An object of this invention is to provide a key board having none of the disadvantages of the conventional devices.

Another object of this invention is to provide a key board to generate output pulse signals without any type of electrical source.

Another object of this invention is to provide a key board reliably operable a long time without maintenance.

Still another object of this invention is to provide a key board capable of generating correct coded signals at a high speed and reliably operable a long time without maintenance.

These objects and other objects of this invention can be attained by a key board of this invention which is provided with a plurality of keys each of which generates an output signal in accordance with keying of the key, characterized in that each of the keys comprises a keying bar of non-magnetic material. A plate of magnetic material is fixed to an end of the keying bar at a substantially right angle to the axis of the keying bar. A cylindrical core through which the keying bar extends axially, has a sensing coil wound thereabout the axis of the keying bar and means for fixing the core are provided. The device comprises means for applying along the axis of the keying bar an elastic force to the keying bar so as to constantly cause physical contact between the plate of the magnetic material with the end of the cylindrical core when the key is not in a depressed condition. Either plate or the cylindrical core is magnetized by a DC magnetic field along the axis of the keying bar and since either is a permanent magnet, an output pulse generated at the time of the keying or depressing of the keying bar is derived through a rectifier from the sensing coil.

Another feature of this invention is that coded signals can be generated from the apparatus of this invention if the sensing coils of the key board are connected to respective column conductor lines of a diode matrix, the row conductor lines of which are connected to a shift register.

The novel features of this invention are set forth with particularity in the appended claims; however, this invention, as to its construction and operation together with other objects and advantages thereof, may best be understood by reference to the following description, taken in connection with the accompanying drawings, in which the same parts are designated by the same characters, numerals and symbols as to one another, and in which:

Figure 7:
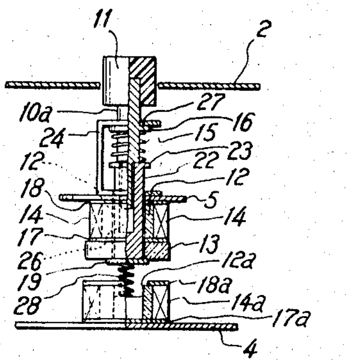
Figure 11:
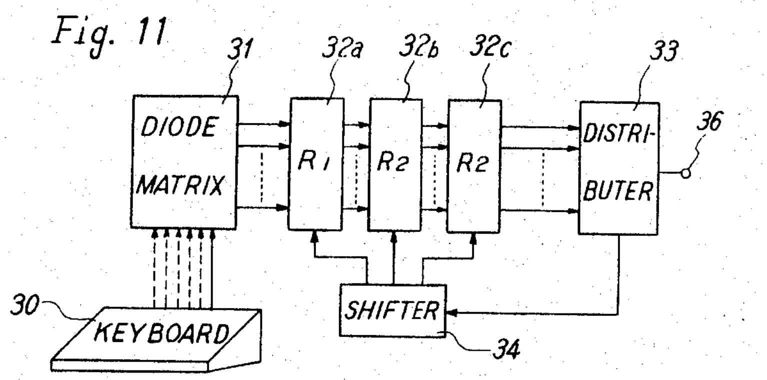
Figure 9:
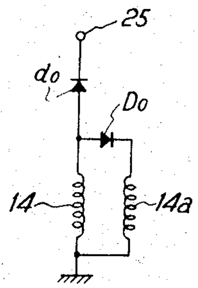
Figure 10:
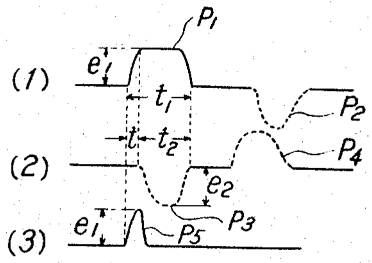
Figure 12:
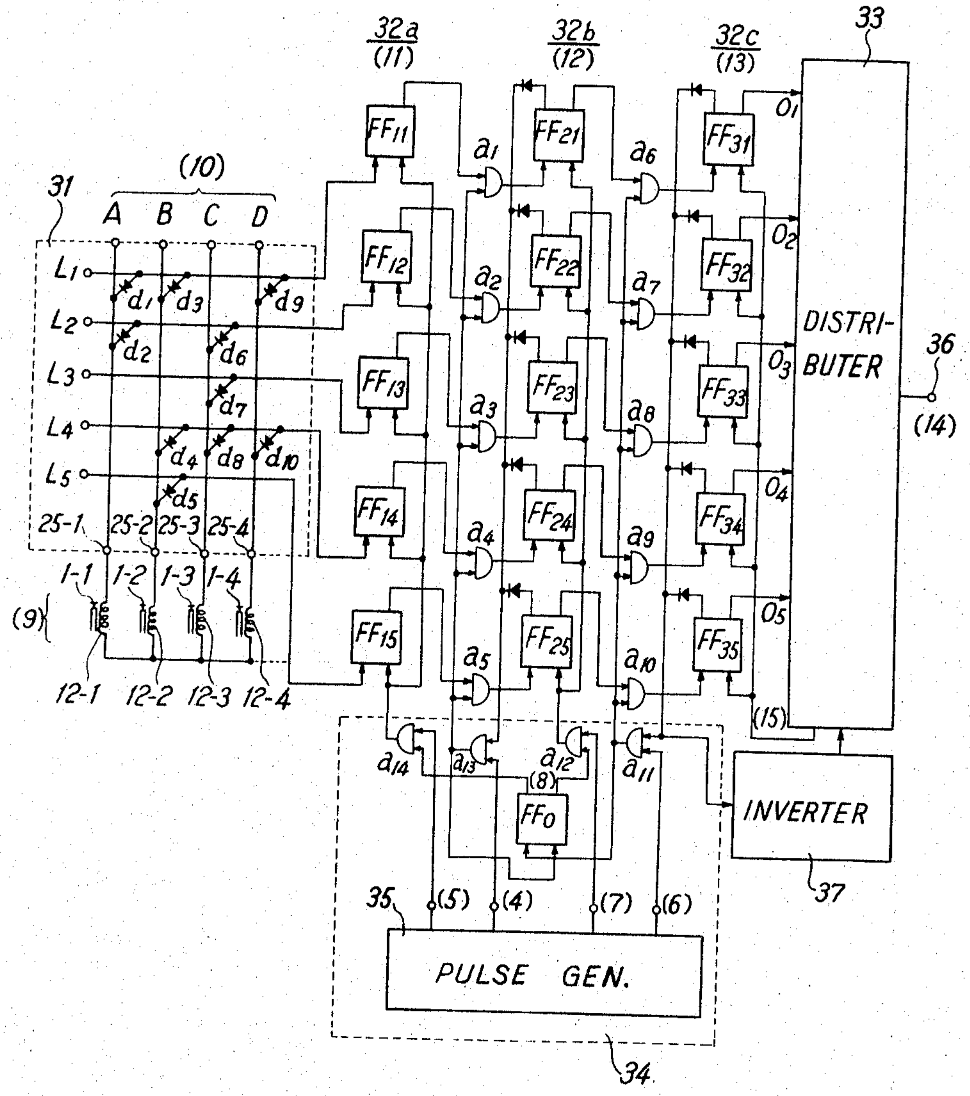
Figure 13:
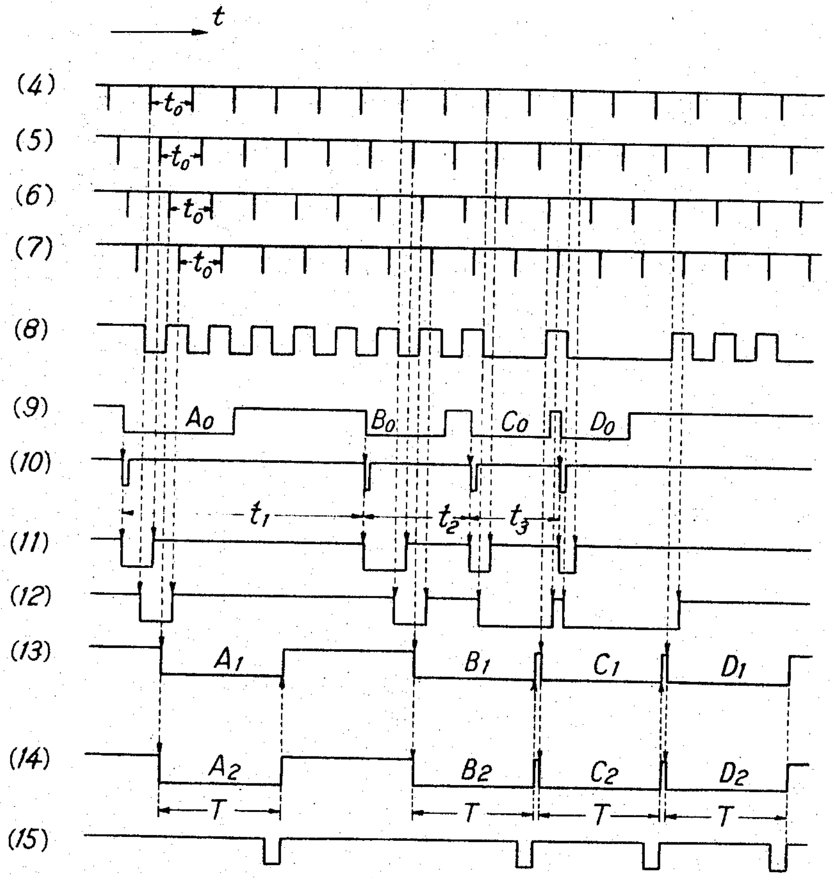

FIGS. 4A, 5A, 6A, and 8A are elevation views, in restored states, of other examples of the keys employed in the key board of this invention;

FIGS. 4B, 5B, 6B and 8B are elevation views in depressed states, of the examples of the keys shown respectively in FIGURES 4A, 5A, 6A and 8A;

FIG. 7 is an elevation view partly in section illustrating another example of the key employed in the key board of this invention;

FIG. 9 is a connection circuit for illustrating the connection of a sensing coil and an auxiliary coil;

FIG. 10 illustrates wave form diagrams for describing the operation of the examples or the connections shown in FIGURES 7, 8A, 8B and 9;

FIG. 11 is a block diagram for illustrating an embodiment of this invention in which coded signals are generated;

FIG. 12 is a connection diagram for illustrating an actual example of the block diagram shown in FIG. 11; and FIG. 13 illustrates wave form diagrams for describing the operation of the connection diagram illustrated in FIGURE 12.

Figure 1:
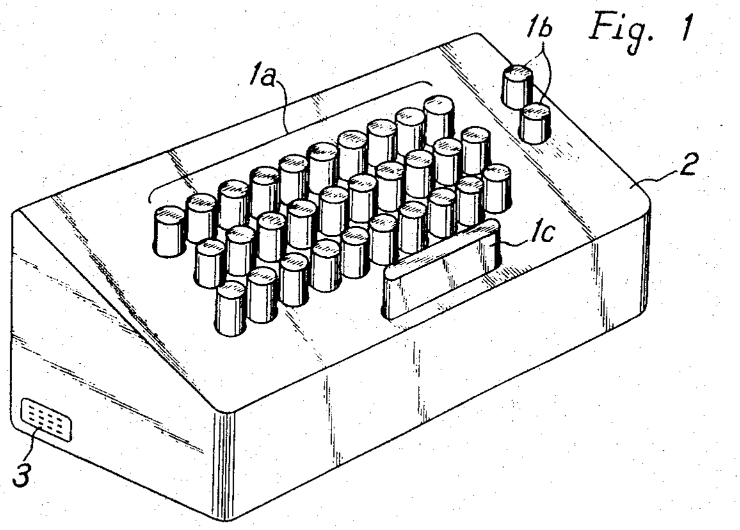
FIG. 1 is a perspective view of an embodiment of this invention.
Figure 2:
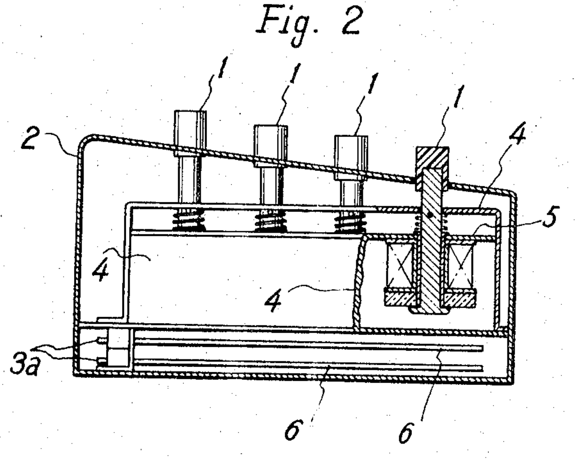
FIG. 2 is a sectional side view of the embodiment shown in FIGURE 1.
Figure 3:
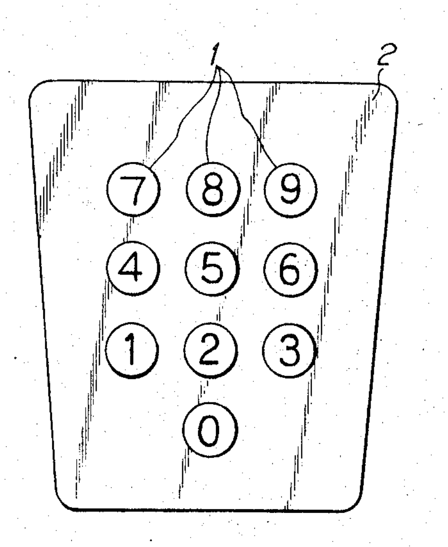
FIG. 3 is a plan view of an example of the key employed in the key board of this invention.

Referring to FIGS. 1 and 2, substantial parts of the key board of this invention will first be described. The key board of this invention is provided with a plurality of keys 1, located in the desired arrangement. If the key board is designed as a key board transmitter of telegraph signals, the key board is provided with a plurality of letter keys 1*a* and other necessary function keys 1*b* and 1*c*. These keys 1*a*, 1*b* and 1*c* are fixed to a plate 5 and covered by a plate 4. Fixed keys 1*a*, 1*b* and 1*c* are covered by a box 2. As shown in FIG. 2, plates 6 of a printed network (described below) and their terminal 3*a* can be accommodated under the keys 1. Output signals of the key board can be derived through a connector 3. As the plate 4 can be of magnetic material it is desirable to avoid the inter-coupling of adjacent keys. However, since the output voltage is considerably large (e.g. several volts), non-magnetic material can be employed.

Figure 4A:
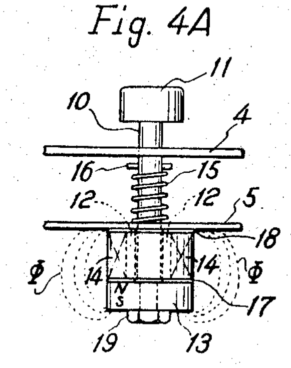
Figure 4B:
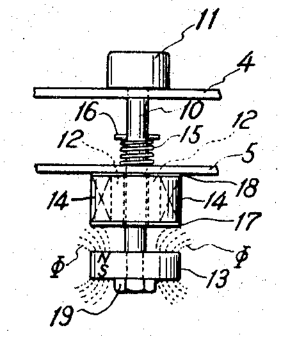

Referring to FIGURES 4A and 4B, the construction and operation of an example of the key will be described. This example is composed of a keying bar 10, a cylindrical core 12, a plate 13, and a sensing coil 14. The keying bar 10 is of non-magnetic material, such as brass or plastic, and has a key top 11 of plastic at its top. The plate 13 is of magnetic material, such as iron, and is fixed, by use of a known fixing means such as a nut 19, to the lower end of the keying bar 10 at a substantially right angle to the longitudinal axis of the keying bar 10. The keying bar 10 passes through the cylindrical core 12, on which the sensing coil 14 is wound along the axis of the keying bar 10. Two flanges 17 and 18 are provided respectively at the ends of the cylindrical core 12. The flanges 18 and the cylindrical core 12 are fixed to the plate 5 of non-magnetic material by means of a conventional fixing means (not shown). A compression spring 15 is arranged so as to be wound on the keying bar 10 and stopped by a stop pin 16 and the plate 5. This compression spring 15 is employed for applying along the axis of the keying bar 10 an elastic force to the keying bar 10 so as to cause contact between the plate 13 with the lower end of the cylindrical core 12 when the key is not in a depressed condition. In case the flange 17, as mentioned above, is provided the plate 13 contacts with the flange 17 arranged at the lower end of the cylindrical core 12. In addition to the above-mentioned construction either the cylindrical core 12 or the plate 13 is magnetized by a DC magnetic field along the axis of the keying bar 10. As a simple and desirable construction either or both of the core 12 and/or plate 13 may be formed as a permanent magnet. Of course, the magnetic field can be produced from a coil (not shown) wound on the core 12 by flowing a DC current into the coil. FIGURE 12 shows a case where the plate 13 is a permanent magnet.

As the result of the above-mentioned construction, magnetic fluxes generated from the plate 13 pass through the flange 17, the core 12, the flange 18 and the outside air. Moreover, the plate 13 is attracted to the flange 17 by the attractive force of the magnet.

If the keying of the key 1 shown in FIG. 4A is carried out by pushing down or depressing the key top 11, the keying bar 10 and the plate 13 are moved down in overcoming the elastic force of the compression spring 15, as shown in FIGURE 4B, so that the plate or permanent magnet 13 departs or separates from the sensing coil 14. In this case, the magnetic fluxes generated by the plate 13 passes solely through a path in the air. Accordingly, the magnetic flux density interlinked with the sensing coil 14 decreases abruptly and a pulse voltage is induced across the sensing coil 14.

After the force pushing down the key is removed from the key top 11, the keying bar 10 is restored to its original state as shown in FIG. 4A since the elastic force of the compression spring 15 pulls up the keying bar 10. At this restoring time, a voltage is induced across the sensing coil 14 since the magnetic flux density interlinked with the sensing coil 14 increases abruptly. However, the induced voltage of this restoring operation has the reverse polarity of the induced voltage of the former keying operation. Accordingly, the induced voltage of the keying operation only can be easily derived from the sensing coil 14 by use of unidirectional means, such as a rectifier element (not shown).

In the above-mentioned operation, the plate 13 separates from the finage 17 only when the downward force applied to the keying bar 10 exceeds the resultant value of the elastic force of the compression spring 15 and of the attractive force between the plate 13 and the flange 17. If the key top 11 is pushed downwardly by a small force erroneously applied, the keying bar 10 is not pushed down unless this small force exceeds the above-mentioned resultant value. Moreover, the plate 13 separates abruptly from the flange 17 at a considerably high initial speed. Accordingly, the voltage induced across the sensing coil at the time of the separation is always over a certain value.

Figure 5A:
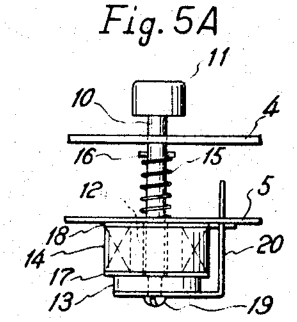
Figure 5B:
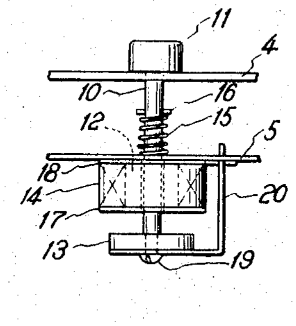

The induced voltage in the sensing coil 14 can be increased by adding another simple means to the key 1. FIGS. 5A and 5B show an example of this case, in which a yoke 20 is provided, outside of the coil 14, from the plate 13 to the flange 18. The yoke 20 is movably coupled to the flange 18. In this example, a closed magnetic circuit is formed, when the key is in a restored state, through the flange 18, the core 12, the flange 17, the plate 13 and the yoke 20. However, if the plate 13 is separated from the flange 17 by pushing down the key top 11, the closed magnetic circuit is opened between the flange 17 and the plate 13. Accordingly, the magnetic flux density interlinked with the sensing coil 14 is changed on a large scale and a large voltage is induced across the sensing coil.

Figure 6A:
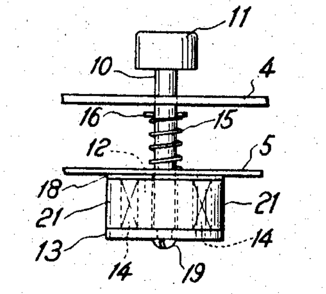
Figure 6B:
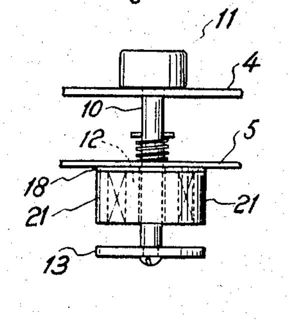

FIGS. 6A and 6B illustrate a similar example of the key in which the closed magnetic circuit is formed by the cylindrical core 12, the flange 18, an outside cylindrical yoke 21 and the plate. In this example, the flange 17 employed in the former examples is removed. If the key shown in FIGS. 5A and 5B is compared with the key of this example, the closed magnetic circuit of this example is more completely formed than the former example. Accordingly, the induced voltage of this example further increases, in comparison with the former example.

FIGURE 7 shows another example of the key 1 in which the keying bar 10 is divided into two parts 10*a* and 22. The part 22 has a cylindrical hole 26 to which the end of the keying bar 10*a* is coupled. The keying bar 10*a* is supported in a hole 27 of an L-shaped holder 24 fixed to the plate 5. In this example, the keying force is applied to the key top 11, the elastic force of the compression spring 15 is applied to the part 22. Only when the elastic force exceeds the attractive force between the plate 13 and the flange 17, do the plate 13 and the part 22 separate apart from the flange 17. Accordingly, this example of the key 1 has a margin to start its operation similarly as the key board of the conventional type writing machine.

A flange 23 of the part 22 is employed for stopping the part 22 when pushed down. The elastic force for restoring the part 22 is applied by a compression spring 28 compressed into its minimum length at the time the part 22 is pushed down to its lowest limit. According to the restoring action of the part 22, the elastic force of the compression spring 15 pushes the stop 16 so as to restore the keying bar 10*a*.

Figure 8A:
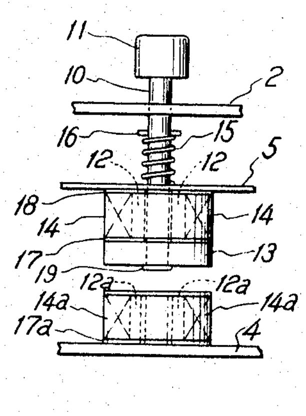
Figure 8B:
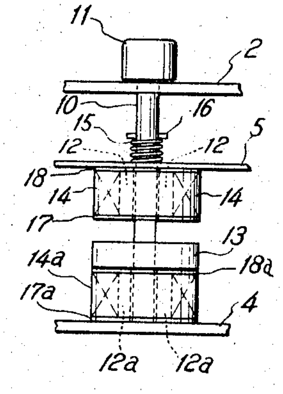

In this example and another example shown in FIGS. 8*a* and 8*b*, the key 1 is further provided with an auxiliary cylindrical core 12*a* with flanges 17 and 18 and an auxiliary coil 14*a* which are respectively substantially the same formations and characteristics as the core 12*a*, the flanges 17 and 18 and the sense coil 14. In this case, the sense coil 14 and the auxiliary coil 14*a* are connected in parallel through a diode $D_0$ as are shown in FIG. 9. A wave form 1 of FIG. 10 shows the induced voltage across the sensing coil 14, and a wave form 2 of FIG. 10 shows the induced voltage across the auxiliary coil 14*a*. Pulses $P_1$ and $P_3$ have a reverse polarity to each other since interlinked fluxes change to the reverse polarity as to the coils 14 and 14*a*. If the voltage $e_1$ is substantially equal to the voltage $e_2$, the resultant output across the sensing coil 14 becomes a pulse $P_5$ having a shorter duration $t$ than the duration $t_1$ of the pulse $P_1$. A pulse $P_4$ is checked by the diode $D_0$ and the pulse $P_2$ is checked by a diode $d_0$. Accordingly, the output terminal 25 of the key 1 generates, per each keying, a unidirectional pulse having an extremely short duration (e.g. 1 millisecond). By providing auxiliary means for reducing the duration of the output pulse, the keys 1 arranged on the key board of this invention can be operated at a considerably high speed of keying without mis-operation.

One example of the key in which a sensing coil with the number of 4000 turns is employed generates a pulse having a voltage more than about 2 volts if the depressing force applied to the key top 11 is over a value 50 grams.

The key board of this invention has a broad application field, such as typewriters and cash registers, to generate coded signals. An example of the type is composed of, as is shown in FIG. 11, the key board 30, a diode matrix 31, shift registers 32*a*, 32*b* and 32*c*, and a distributor 33. The diode matrix 31 codes the output pulse of the key board 30. The shift registers 32*a*, 32*b* and 32*c* are controlled by a pulse generator 34 and shifts successively the output pulses of the diode matrix 31. The distributor 33 converts parallel input signals into a serial coded signal.

FIG. 12 shows an actual example of the block diagram shown in FIG. 11. In this example, sensing coils (12–1, 12–2, 12–3 . . .) of the keys 1–1, 1–2, 1–3, 1–4 . . . (which correspond respectively to alphabets A, B, C, D . . .) are connected respectively to column lines of the diode matrix 31. These column lines are connected to row lines $L_1$, $L_2$, $L_3$, $L_4$ and $L_5$ through diodes $d_1$, $d_2$ . . . at corresponding interconnection points. In this diode matrix 31, the output signals of the keys 1–1, 1–2, 1–3 . . . are coded into 5-unit coded signals which are applied to the first register 32*a*. This register 32*a* and the succeeding registers 32*b* and 32*c* are composed of five bistable circuits ($FF_{11}$ to $FF_{15}$), ($FF_{21}$ to $FF_{25}$) and ($FF_{31}$ to $FF_{35}$) respectively. The first register 31*a* is connected through AND gates ($a_1$ to $a_5$) to the second register 32*b*, which is connected through an AND gate ($a_6$ to $a_{10}$) to the third register 32*c*. Each of the bistable circuits in FIGURE 12 is set by the left side input and reset by the right side input. In the set state, the right side output and the left side ouput of each bistable circuit assume respectively the states "1" and "0." At the reset state, the output conditions are replaced as to each other. The shifter 34 is composed of a pulse generator 35, a bistable circuit $FF_0$ and AND gates $a_{11}$ to $a_{14}$.

Time charts of respective portions are illustrated in FIGURE 13 by use of the same reference numerals as shown in FIGURE 12. In these time charts, the operation of the device in response to successive keying 9 of the keys (A, B, C and D) is illustrated. The output pulses 10 of the keys reset the corresponding bistable circuits or circuits of the first register 31*a* at times shown in the time chart 11. Each pulse of the time chart 4 shifts the states of the bistable circuits of the first register 32*a* into the bistable circuits of the second register 32*b* as are shown in the time chart 12. Each of the pulses of the time chart 5 resets the states of the bistable circuits of the first register 31*a* as shown in the time chart 11. Similarly as mentioned above, the states of the second register 32*b* are shifted into the third register 32*c* by use of pulse signals 6 and 7. The shift of the states from the register 32*c* to the distributor 33 is carried out by use of pulses 15 which are generated at the end of each operation cycle of the distributor 33. The bistable circuit $FF_0$ is employed to inhibit the shift from the first or second register to the second or third register unless the state of the succeeding register is read out to its succeeding stage. When any of the bistable circuits $FF_{31}$ to $FF_{35}$ is set, the state "0" of the left side output of the set bistable circuit is applied, through an inverter 37, to the distributor 33 so as to start the operation of this distributor 33.

As the result of this operation, the coded signals are derived through the output terminal 36 at the intervals shown in the time chart 14. If the parallel coded signals are desirable, they can be derived from the parallel outputs $O_1$ to $O_5$ of the third register 32*c*. The number of states of the registers 32*a*, 32*b*, 32*c* . . . may be changed in accordance with the unit operation time T (shown in the time chart 14) of the distributor 33 and/or other succeeding states.

Since it is obvious that there are many changes and modifications of the apparatus of the key board of this invention without departing from the spirit of the invention, the scope of the invention is not to be limited to details described above except the recitations of the appended claims.

What we claim is:

1. A key board having a plurality of keys each comprising a keying bar of non-magnetic material, on each keying bar a plate of magnetic material fixed to an end thereof substantially at right angles to the longitudinal axis of the bar, for each bar an annular sensing coil having a cylindrical core through which the bar extends and disposed axially spaced from said plate, means applying an elastic force longitudinally of each bar effective to constantly bias said plate into engagement with said core, means constantly developing between the plate and said core a magnetic field for developing a signal when a given key is depressed to move said bar axially and separate said plate and said core, and a rectifier connected to receive a signal from said coil induced in said coil when said key is depressed.

2. A key board according to claim 1, in which said plate of each key comprises a permanent magnet.

3. A key board according to claim 1, in which said plate comprises a permanent magnet.

4. A key board according to claim 1, in which said core comprises a flange at each end thereof and in which said plate engages one of the flanges.

5. A key board according to claim 1, including for each key outwardly of said core a yoke forming a closed magnetic circuit between said plate and said core only when respective key is in a non-depressed condition.

6. A key board according to claim 1, in which each key comprises an auxiliary cylindrical core disposed to be engaged by said plate when a respective key is depressed, an auxiliary sensing coil on each respective auxiliary core, and rectifier means for each key connecting the two sensing coils in parallel.

7. A key board according to claim 6, in which said bar of each key comprises two parts, a first one of said parts, disposed extending axially through the first mentioned core, a second part disposed axially in said auxiliary core spaced axially from said first part, and elastic means extending axially between the two parts tending to separate the two parts when said key is depressed.

8. A key board according to claim 1, including a diode matrix connected to each sensing coil comprising column connector lines connecting the sensing coil to said diode matrix, a shift register connected to said diode matrix for shifting output parallel pulses of all the column connector lines of said diode matrix.

9. A key board according to claim 8, including distributor means to receive output parallel pulses from said matrix and distribute said pulses serially, and row conductor lines of said matrix connecting said distributor thereto.

References Cited

UNITED STATES PATENTS

| | | | |
|---|---|---|---|
| 2,902,092 | 9/1959 | Hilderbrandt | 197—98 XR |
| 2,964,740 | 12/1960 | Hense | 235—145 XR |
| 2,997,703 | 8/1961 | Powell | 235—145 XR |
| 3,129,418 | 4/1964 | De la Tour | 197—98 XR |
| 3,251,962 | 5/1966 | Jones | 197—98 XR |
| 3,233,061 | 2/1966 | Jones | 197—98 XR |

ROBERT E. PULFREY, *Primary Examiner.*

E. S. BURR, *Examiner.*